(12) United States Patent
Taylor et al.

(10) Patent No.: US 9,731,204 B2
(45) Date of Patent: Aug. 15, 2017

(54) MATCHMAKING SYSTEM FOR MASSIVE MULTIPLAYER ONLINE GAMES

(71) Applicant: Mail.Ru Games, LLC, Moscow (RU)

(72) Inventors: Richard Weston Taylor, Ladera Ranch, CA (US); Twain Aieta Martin, Ladera Ranch, CA (US); Matthew Alan Festa, Mission Viejo, CA (US)

(73) Assignee: Mail.Ru LLC, Moscow (RU)

( * ) Notice: Subject to any disclaimer, the term of this patent is extended or adjusted under 35 U.S.C. 154(b) by 152 days.

(21) Appl. No.: 14/602,270

(22) Filed: Jan. 21, 2015

(65) Prior Publication Data

US 2016/0206961 A1    Jul. 21, 2016

(51) Int. Cl.
*G06F 17/00* (2006.01)
*A63F 13/795* (2014.01)

(52) U.S. Cl.
CPC .................................. *A63F 13/795* (2014.09)

(58) Field of Classification Search
USPC ...................................... 463/40–44
See application file for complete search history.

(56) References Cited

U.S. PATENT DOCUMENTS

| | | | |
|---|---|---|---|
| 9,002,945 B2* | 4/2015 | Harris | G06Q 10/109 463/42 |
| 2009/0042646 A1* | 2/2009 | Sarkar | H04L 67/38 463/29 |
| 2009/0325712 A1* | 12/2009 | Rance | A63F 13/12 463/42 |
| 2016/0001181 A1* | 1/2016 | Marr | A63F 13/30 463/42 |

* cited by examiner

*Primary Examiner* — Ronald Laneau
(74) *Attorney, Agent, or Firm* — TransPacific Law Group; Pavel I. Pogodin, Esq.

(57) ABSTRACT

In accordance with one aspect of the embodiments described herein, there is provided a matchmaking system for massive multiplayer online games. In one or more embodiments, the described matchmaking system is easily tunable enabling the gaming administrator to make quick adjustments to the parameters of the matchmaking system. The system is configured to provide game players with a fair gameplay experience across their entire career of matches. Fine tuning of the point values assigned to vehicles, the player-specific point modifiers, and the point ranges used for creating matches allows for long-term improvement to the matchmaking results. In one or more embodiments, the matchmaking system assigns points to each game player and a vehicle and relies on specific point ranges and values assigned to vehicle, and player specific point modifiers.

20 Claims, 6 Drawing Sheets

ID# MATCHMAKING SYSTEM FOR MASSIVE MULTIPLAYER ONLINE GAMES

BACKGROUND OF THE INVENTION

Field of the Invention

The disclosed embodiments relate in general to the field of video gaming software and in particular to systems and methods for generating matches in a massive multiplayer online game using a point-based system.

Description of the Related Art

Rise of massive multiplayer online games in popularity causes the rise of gamers involved in playing online games. The object of many massive multiplayer games is competitions between players or commands of players, which are use different game characters, abilities, vehicles etc. Due to gamers have different levels of gaming experience, game abilities, etc. combining them to common competition groups may cause significant misbalance between different commands or players and made some of the players bored and some of them frustrated because of too difficult competitors.

Therefore, new and improved matchmaking systems and methods are needed for generating massive multiplayer online games matches that would rank the players basing on their game experience, game abilities, game characters, vehicles, or etc. for organizing competitions between players who are the similar in their strengths and abilities. The matchmaking system must choose the players such that their abilities to win the competition are approximately equal. Choosing players who have equal abilities to win solves the problem of fair gameplay experience. The competitions, which are organized in this manner, provide the players with more satisfaction from playing the game.

SUMMARY OF THE INVENTION

The inventive methodology is directed to methods and systems that substantially obviate one or more of the above and other problems associated with conventional techniques for implementing matchmaking in massive multiplayer online games.

In accordance with one aspect of the embodiments described herein, there is provided a computerized system for matchmaking a plurality of players in a multiplayer online game into two player teams, the system comprising a processing unit and a memory, the memory containing a set of instructions, which, when executed by the processing unit cause the processing unit to perform a method involving: identifying a player from the plurality of players as a match seed player; establishing a point range based on a total number of points associated with the identified match seed player, wherein the point range represents a minimum and a maximum number of points that a player from the plurality of players would be required to have in order to be considered for the player team; providing a plurality of buckets, each bucket representing a predetermined need within a team of players; temporarily assigning players from the plurality of players to the plurality of buckets; assigning the players from the plurality of players to a plurality of class pools based on a vehicle class associated with each player of the plurality of players; and distributing players assigned to each class pool between two teams one at a time based on point values associated with the respective players.

In one or more embodiments, the method further involves establishing a matchmaking queue and temporarily assigning each of the plurality of players into the matchmaking queue based on a time when the player joined a game session.

In one or more embodiments, the match seed player is a player from the plurality of players who has spent the longest time in the matchmaking queue.

In one or more embodiments, each of the plurality of buckets is associated with a second point range and wherein the players from the plurality of players are assigned to the plurality of buckets based on a total number of points associated with each player and the second point range of each bucket.

In one or more embodiments, the second point range of each bucket in the plurality of buckets expands based on a predetermined time interval to allow more players to be assigned to the bucket.

In one or more embodiments, the point range is determined by adding to and subtracting a predetermined percentage of the total number of points associated with the identified match seed player from the total number of points associated with the identified match seed player.

In one or more embodiments, the point range is additionally determined using a randomization factor and wherein the randomization factor varies based on a match such that the point range of a first match is different from the point range of a second match.

In accordance with another aspect of the embodiments described herein, there is provided a computer-implemented method for matchmaking a plurality of players in a multiplayer online game into two player teams, the computer-implemented method being performed in a system comprising a processing unit and a memory, the method involving: identifying a player from the plurality of players as a match seed player; establishing a point range based on a total number of points associated with the identified match seed player, wherein the point range represents a minimum and a maximum number of points that a player from the plurality of players would be required to have in order to be considered for the player team; providing a plurality of buckets, each bucket representing a predetermined need within a team of players; temporarily assigning players from the plurality of players to the plurality of buckets; assigning the players from the plurality of players to a plurality of class pools based on a vehicle class associated with each player of the plurality of players; and distributing players assigned to each class pool between two teams one at a time based on point values associated with the respective players.

In one or more embodiments, the method further involves establishing a matchmaking queue and temporarily assigning each of the plurality of players into the matchmaking queue based on a time when the player joined a game session.

In one or more embodiments, the match seed player is a player from the plurality of players who has spent the longest time in the matchmaking queue.

In one or more embodiments, each of the plurality of buckets is associated with a second point range and wherein the players from the plurality of players are assigned to the plurality of buckets based on a total number of points associated with each player and the second point range of each bucket.

In one or more embodiments, the second point range of each bucket in the plurality of buckets expands based on a predetermined time interval to allow more players to be assigned to the bucket.

In one or more embodiments, the point range is determined by adding to and subtracting a predetermined percentage of the total number of points associated with the identified match seed player from the total number of points associated with the identified match seed player.

In one or more embodiments, the point range is additionally determined using a randomization factor and wherein the randomization factor varies based on a match such that the point range of a first match is different from the point range of a second match.

In accordance with yet another aspect of the embodiments described herein, there is provided a non-transitory computer-readable medium containing a set of instructions for matchmaking a plurality of players in a multiplayer online game into two player teams, the set of instructions, when executed in connection with a system comprising a processing unit and a memory, causes the processing unit to perform a method involving: identifying a player from the plurality of players as a match seed player; establishing a point range based on a total number of points associated with the identified match seed player, wherein the point range represents a minimum and a maximum number of points that a player from the plurality of players would be required to have in order to be considered for the player team; providing a plurality of buckets, each bucket representing a predetermined need within a team of players; temporarily assigning players from the plurality of players to the plurality of buckets; assigning the players from the plurality of players to a plurality of class pools based on a vehicle class associated with each player of the plurality of players; and distributing players assigned to each class pool between two teams one at a time based on point values associated with the respective players.

In one or more embodiments, the method further involves establishing a matchmaking queue and temporarily assigning each of the plurality of players into the matchmaking queue based on a time when the player joined a game session.

In one or more embodiments, the match seed player is a player from the plurality of players who has spent the longest time in the matchmaking queue.

In one or more embodiments, each of the plurality of buckets is associated with a second point range and wherein the players from the plurality of players are assigned to the plurality of buckets based on a total number of points associated with each player and the second point range of each bucket.

In one or more embodiments, the second point range of each bucket in the plurality of buckets expands based on a predetermined time interval to allow more players to be assigned to the bucket.

In one or more embodiments, the point range is determined by adding to and subtracting a predetermined percentage of the total number of points associated with the identified match seed player from the total number of points associated with the identified match seed player.

In one or more embodiments, the point range is additionally determined using a randomization factor and wherein the randomization factor varies based on a match such that the point range of a first match is different from the point range of a second match.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a matchmaking system for massive multiplayer online games. In one or more embodiments, the described matchmaking system is easily tunable enabling the gaming administrator to make quick adjustments to the parameters of the matchmaking system. The system is configured to provide game players with a fair gameplay experience across their entire career of matches. Fine tuning of the point values assigned to vehicles, the player-specific point modifiers, and the point ranges used for creating matches allows for long-term improvement to the matchmaking results. In one or more embodiments, the matchmaking system assigns points to each game player and a vehicle and relies on specific point ranges and values assigned to vehicle, and player specific point modifiers.

Figure 1:
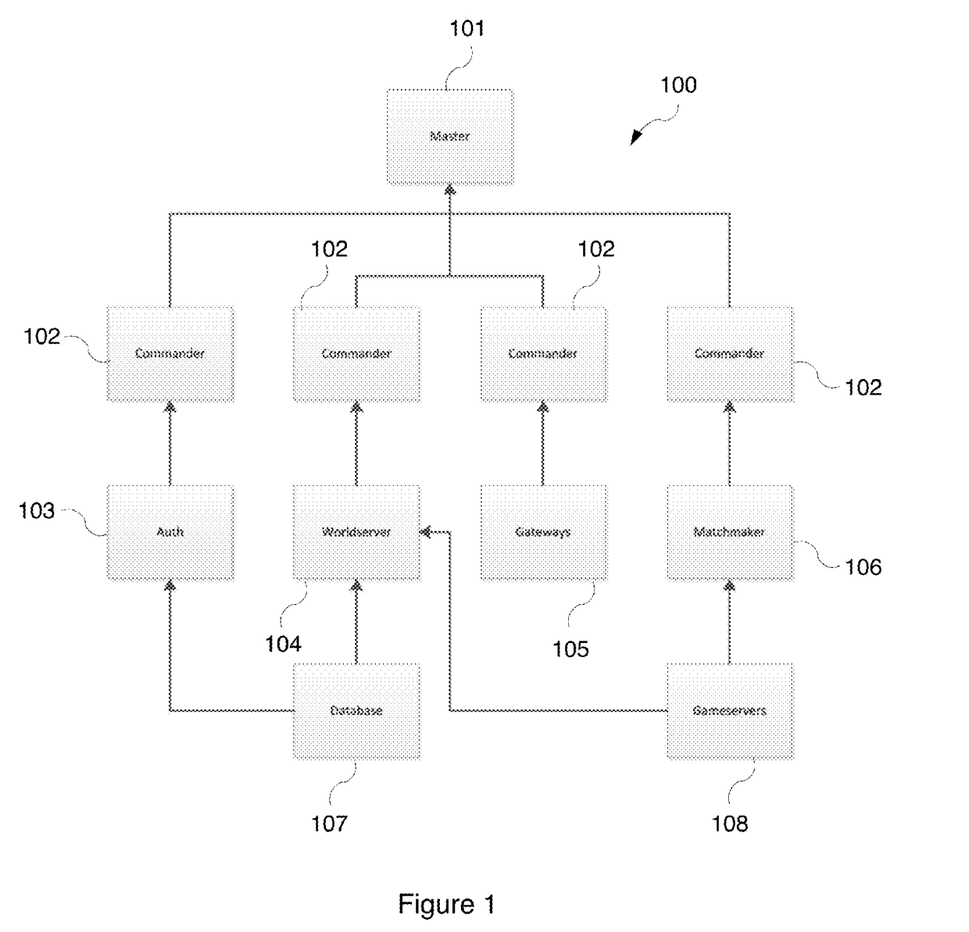
FIG. 1 illustrates an exemplary embodiment of a matchmaking system for massive multiplayer online games.

FIG. 1 illustrates an exemplary embodiment of a matchmaking system 100 for massive multiplayer online games. In various embodiments, the matchmaking system 100 incorporates the following functional modules, which may be deployed on one or more computing platforms. Specifically, the matchmaking system 100 incorporates a master module 101, which is configured to perform command and control over all the remaining modules of the matchmaking system 100. Specifically, the master module 101 issues orders to start or stop various processes performed within the matchmaking system 100 via commander modules 102.

In one or more embodiments, the commander modules 102 are responsible for running and stopping various processes performed within the matchmaking system 100 and monitoring the health of the aforesaid active processes. The matchmaking system 100 may further include an authentication server 103 configured to handle account logins from the users of the matchmaking system 100. The aforesaid authentication may be based on various now known or later developed user authentication techniques, including, without limitation, a password/PIN sign-on, a biometric authentication, a symmetric or asymmetric key authentication, a public key authentication or a hardware device authentication.

In one or more embodiments, the matchmaking system 100 may further incorporate a worldserver 104, which is a data server responsible for handling messages to and from various game clients (not shown) operating in conjunction with the matchmaking system 100. The matchmaking system 100 may further include one or more gateways 105. In one embodiment, the gateway 105 is load balance server responsible for routing messages between game clients (not shown) and the worldserver 104. The matchmaking system 100 may further include a matchmaking server 106, which is responsible for handling a matchmaking queue and overall matchmaking logic the operation of which is described in detail below.

In one or more embodiments, a database 107 is responsible for persisting data such as player accounts and match results. In various embodiments, the database 107 may be implemented based on any now known or later developed type of database management system, such as a relational database management system, including, without limitation, MySQL, Oracle, SQL Server, DB2, SQL Anywhere, PostgreSQL, SQLite, Firebird and/or MaxDB, which are well-known to persons of skill in the art. In an alternative embodiment, a cloud-based distributed database, such as Amazon Relational Database Service (Amazon RDS), well known to persons of ordinary skill in the art, may also be used to implement the database 107. Finally, the matchmaking system 100 may incorporate one or more gameservers 108 responsible for providing clients with running matches to play on.

Figure 2:
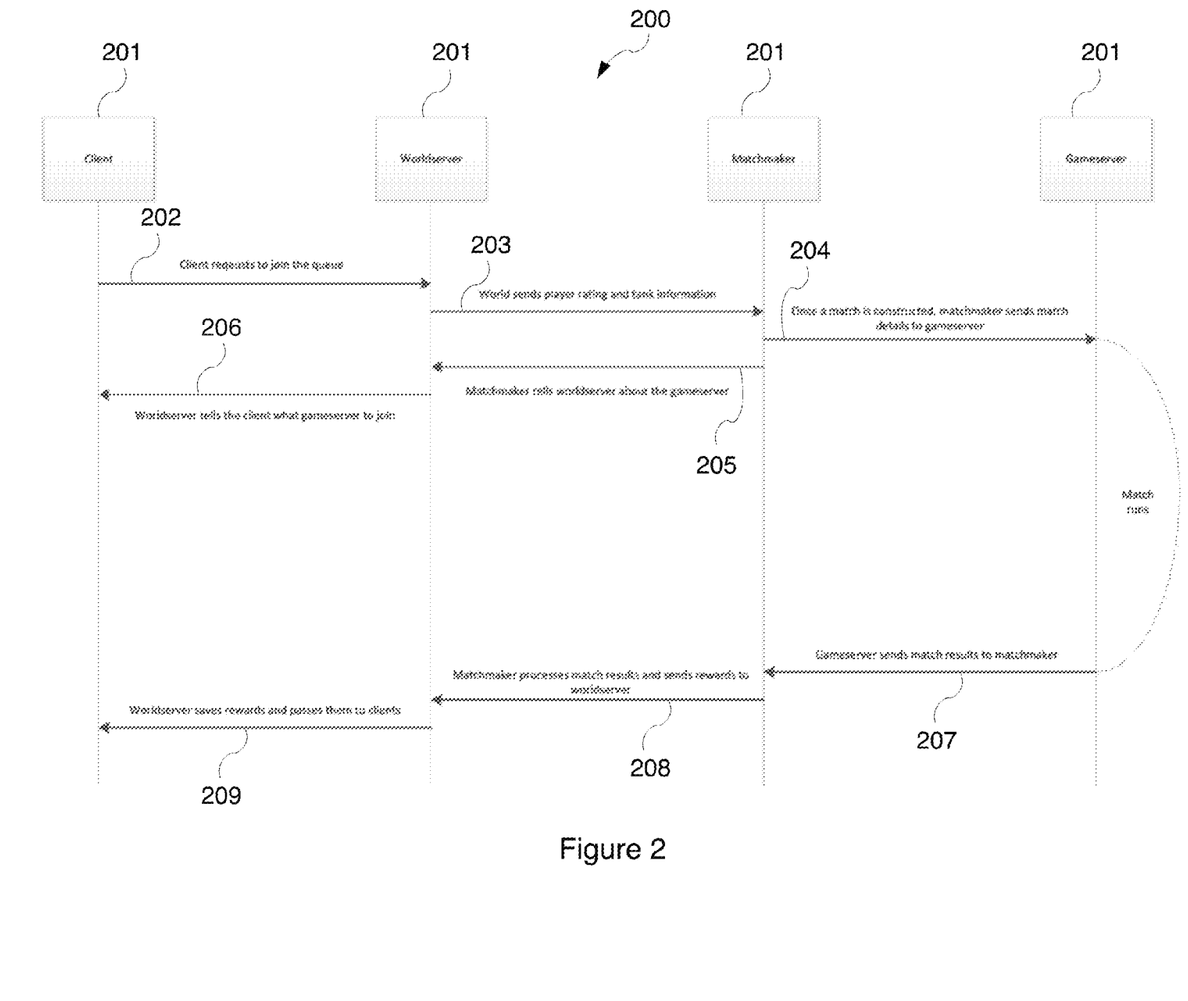
FIG. 2 illustrates an exemplary embodiment of a data flow of an embodiment of a matchmaking system for massive multiplayer online games.

FIG. 2 illustrates an exemplary embodiment of a data flow 200 of an embodiment of a matchmaking system 100 for massive multiplayer online games. The exemplary data flow 200 shown in FIG. 2 involves a game client 201, the worldserver 104, the matchmaking server 106 and the gameserver 108. Initially, a game client 201 sends a request 202 to the worldserver 104 to join the matchmaking queue. In various embodiments, the aforesaid matchmaking queue includes vehicles and users (also referred to as players) awaiting matchmaking in accordance with the techniques described herein. Subsequently, the worldserver 104 sends player rating and the corresponding vehicle (such as a tank) information 203 to the matchmaking server 106. Upon the receipt of this information 203, the matchmaking server 106 uses the received information to determine the match and, once the match is constructed, sends the corresponding match details 204 to the gameserver 108. The gameserver 108, in turn, enables a game session using the received match details 204.

The matchmaking server 106 informs the worldserver 104 about the gameserver 108, see 205 in FIG. 2. Subsequently, the worldserver 104 instructs the client 201 to join a specific gameserver 108, see 206 in FIG. 2. After the completion of the gaming session, the gameserver 108 sends match results 207 back to the matchmaking server 106. Subsequently, the matchmaking server 106 processes the received match results and sends the corresponding game rewards information 208 to the worldserver 104. The worldserver 104, in turn, saves the received game reward information and forwards the game reward information to the client 201.

In one or more embodiments, a game player's point total used in matchmaking is the sum of:

1. A vehicle point value based on the vehicle with which the player has entered the queue. This unique value is assigned to each individual vehicle by the Ohio game designers based on the vehicle's performance stats (health, armor, damage, mobility, spotting range, etc.) and 2. A set of player-specific point values based on a number of additional criteria, including (but not limited to): a. the player's skill. Initially this will determined by the player's win rate but can be expanded to a more intricate calculation using additional factors; b. the player's chosen loadout for the selected vehicle (parts, equipment, ammunition); c. the player's number of matches overall; and d. the player's number of matches in the selected vehicle.

In one or more embodiments, each vehicle in the game is assigned a single point value (instead of a range of battle tiers) which is then modified (increased or decreased) by a number of variables such as player skill and vehicle loadout. Since each new match that is created uses a different starting point value as the seed, each new match will also have a variable allowable point range that defines which vehicles can be placed into that match. This point range is further modified by a randomization factor, which may slightly increase or decrease the initial allowable point range. Therefore, two vehicles with different point values may be allowed into a match together if the final calculated point range is large enough, while the same two vehicles may not be allowed in a match together if the point range is much smaller.

In one or more embodiments, the matchmaking system uses a unique vehicle point value assigned to every individual vehicle in the game, meaning that right from the start of the matchmaking process, each vehicle is treated uniquely based on the specific qualities of that vehicle. Although each vehicle in the matchmaking system will have a class and tier assigned to it for the sake of progression (advancement through the game), tier and type are not used for identifying which vehicles can be placed together in a match pool. Exemplary vehicle classes are tanks, armored personnel carriers or self-propelled guns. On the other hand, the tier assigned to the vehicle is based on the vehicle's performance and, optionally, other battle-related characteristics within its class, such as a speed of the vehicle or a power of its engine.

In one or more embodiments, each individual vehicle in the game has a unique vehicle point value assigned based on the quality and performance of the stock, un-upgraded version of the vehicle. These values may be tuned and are used exclusively in matchmaking, and are never displayed or revealed to the player. In one embodiment, these point values are roughly in-line with the vehicle's tier. For example, a Tier 8 vehicle will generally be in the 8,000-8,999 point range with an average of around 8,500 and a Tier 3 vehicle will be in the 3,000-3,999 point range with an average of 3500. Although the initial point range is tier-based, minor adjustment to the vehicle's point total will be based on (but not limited to) one or more of the following criteria:

Vehicle Horsepower (HP);
Vehicle Armor Protection (averages);
Vehicle Weapon Penetration;
Vehicle Damage per Minute (DPM);
Vehicle Alpha Damage;
Vehicle Mobility (Acceleration, Top Speed, Traverse) Spotting Range; and/or
Camouflage Factor.

In cases where it is desirable to have exclusive matchmaking for certain premium vehicles (meaning the vehicle will tend to be in the highest tier represented in a given match), assigning the vehicle a slightly lower point total will cause the vehicle to frequently (but not always) end up in the match's top tier. For example, if most Tier 3 vehicles have a point value that is around 3,500 points, assigning a Tier 3 premium an exclusive matchmaking point value of 2,900 will mean that it will still occasionally end up in matches with Tier 4 vehicles, but will more likely be placed in matches with tier 2 and 3 vehicles.

In instances where a platoon (group of players) queues together instead of a single player, the single highest point value from all the vehicles/players in the platoon will be used for all of the matchmaking steps below.

In one or more embodiments, the player point values are used to slightly adjust the matchmaking based on specific criteria and can be added or removed as necessary to silently balance the results of the matchmaking system over time. It is important to note that these player point values will always be much s mailer than the vehicle point values assigned to each vehicle and are intended to only occasionally push certain players into slightly more or less competitive matches under specific conditions. It is intended that the majority of the time, the point ranges established for a match will be wide enough that these player point values will not alter the outcome of the matchmaking beyond what the vehicle point value would have caused by itself.

Examples of player point values based on player skill:
Win rate less than 45%: −100 points
Win rate between 45% and 48%: −50 points Win rate between 52% and 55%: 75 points Win rate above 55%: 150 points Examples of player point values based on the player's chosen loadout for the selected vehicle:
Any optional part equipped: 50 points
Top (highest caliber) gun equipped: 45 points
For each piece of equipment that is equipped: 25 points If any premium ammunition is loaded: 15 points Examples of player point values based on the player's overall match count:
Less than 100 matches: −250 points Between 100 and 500 matches: −75 points Above 2,500 matches: 100 points
Above 5,000 matches: 150 points
Above 10,000 matches: 200 points Examples of player point values based on the player's selected vehicle match count:
Less than 10 matches: −200 points More than 100 matches: 75 points Using the vehicle point values and player point values, a point total is immediately calculated for each player as they enter the queue. An example of a point total calculation:

A player queues up with a T-80 (6,500 points) with no matches played in the vehicle (−200 points) and with stock parts and no equipment into the queue. The player has a win rate of 52% (+75 points) and 2,600 total matches (+100 points).

$$6,500-200+75+100=6,475.$$

Figure 3:
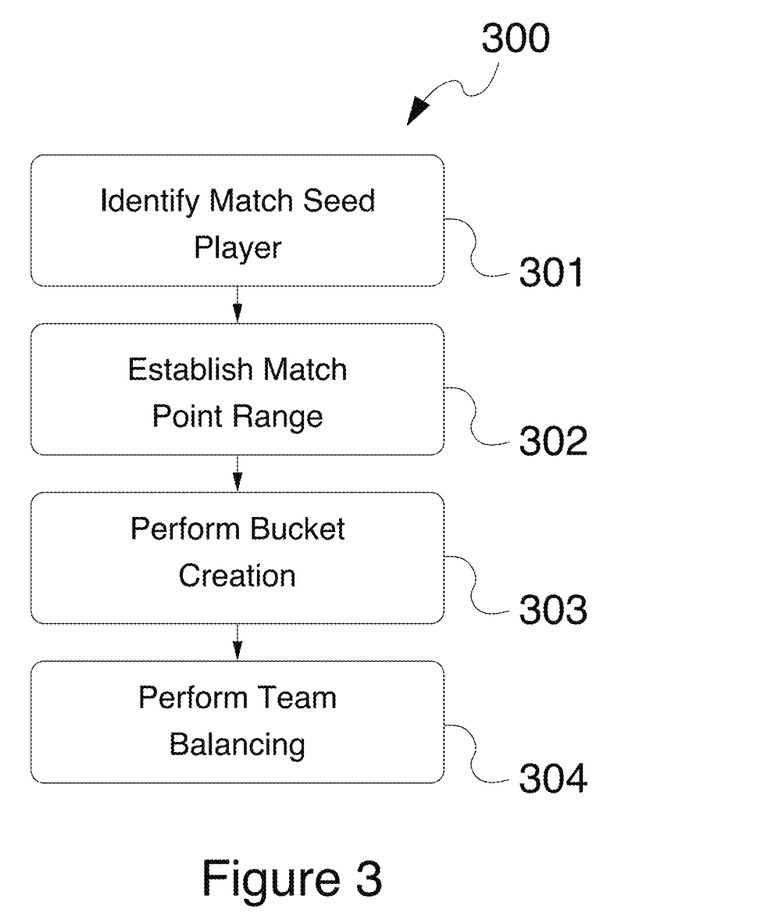
FIG. 3 illustrates an exemplary embodiment of an operating sequence of an embodiment of a matchmaking process executed by the matchmaking server for massive multiplayer online games.

FIG. 3 illustrates an exemplary embodiment of an operating sequence 300 of an embodiment of a matchmaking process executed by the matchmaking server 106 for massive multiplayer online games. First, at step 301 a seeding is performed. This first step 301 in the matchmaking process is to identify a player as a match seed. The seed player for a new match in the matchmaking system is the player who has spent the longest time in the matchmaking queue (the "oldest" player).

Subsequently, at step 302, the matchmaking server 106 performs point range establishment. In various embodiments, the seed's point total is used as the starting point to calculate the point range used for allowing queued players into a match. The point range represents the minimum and maximum number of points that a queued player would be required to have in order to be considered for the match. The ideal point range represents the point range that the matchmaking system will use in the first pass through the queue of all available players. This ideal point range is a represented by a +/− percentage of the seed's point total (for example, +/−10%) and will be a variable value that can be tuned over time to continually improve the performance ("fairness") of the system.

In one embodiment, the ideal point range will also include a randomization factor, which will create some matches with tighter point ranges and others with wider point ranges. This randomization factor is also represented by a +/− percentage which adjusts the ideal point range and it is re-randomized for each match that is created.

At step 303, the matchmaking server 106 performs bucket creation. During this step, the matchmaking server 106 will hold a number of "buckets" which are being used to temporarily hold players who are waiting for a match. These buckets represent different needs—one bucket might be looking for more MBTs; one bucket might be missing TDs and LBTs; etc. When a player joins the queue, the bucket system will search for a bucket to place him in, prioritizing first time (searching the oldest buckets first), then player rating (does this player fall in this bucket's point range), then tank class (is this player's tank needed for this bucket to make a match). If a player bucket fills up with the requisite players manning the requisite tanks, then a match is created using those players and their tanks. The buckets will expand their player rating requirements on specific intervals; for example, if a bucket has existed for one minute, the point range for that bucket will expand by a percentage so that a broader range of players can join it. If a bucket exists for a maximum length of time, it will either start immediately (if its minimum match conditions have been met) or it will disband and its players will be sorted into different existing buckets.

Finally, at step 304, the matchmaking server 106 performs team balancing. Once a group of a predetermined number of players is selected, the players are split into class pools (groups of players divided by vehicle class) and then each class pool is distributed among the two teams one at a time based on point value. For example, if there are 4 MBTs in the match bucket, the MBT with the highest point total will be added to Team A, the second highest to Team B, the third to Team B, and the last to Team A. For platoons, the highest point total vehicle from the first platoon is added to Team A along with the remaining platoon members, then the highest point total vehicle from the second platoon is added to Team B along with the remaining platoon members, etc. In order to prevent Team A on a map from always getting the highest point total players, the order of assignment (Team A first or Team B first) will be randomized each time team balancing occurs.

Figure 4:
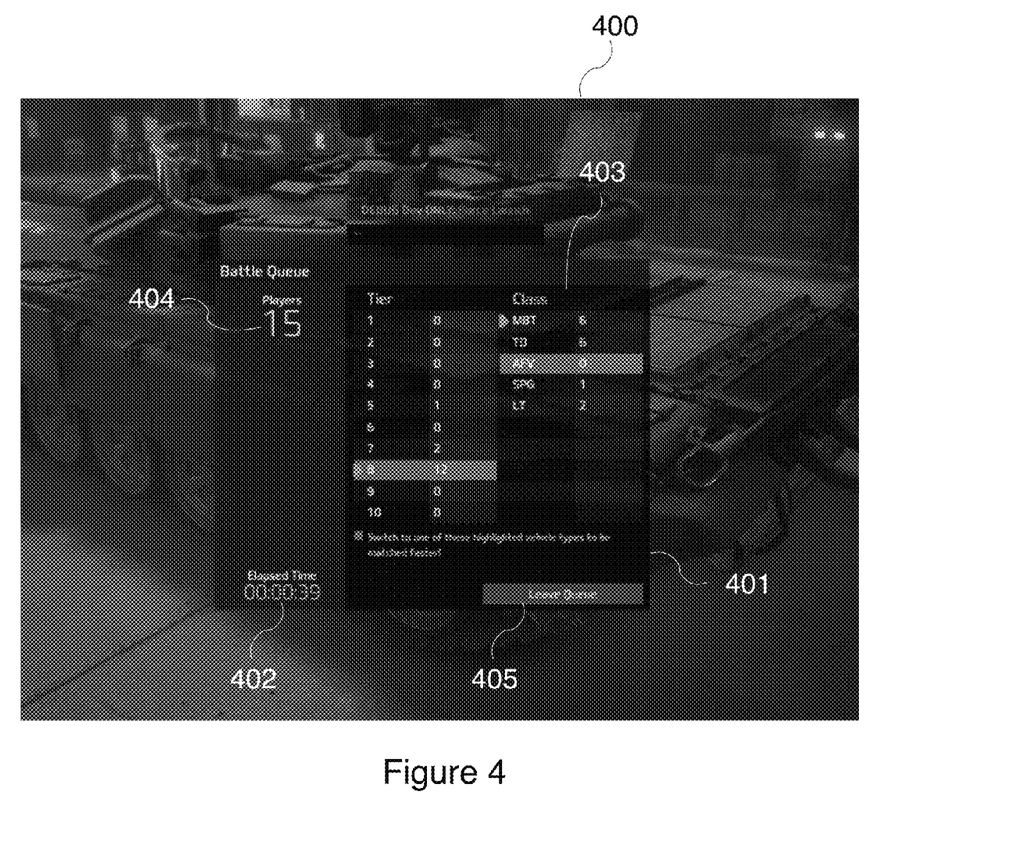
FIG. 4 illustrates an exemplary embodiment of graphical user interface of a matchmaking system for massive multiplayer online games.

FIG. 4 illustrates an exemplary embodiment of graphical user interface 400 of a matchmaking system for massive multiplayer online games. In one embodiment, after the player clicks on the battle button in the interface, a matchmaking queue screen 401 is displayed as an overlay UI element. A timer 402 is provided to count up to indicate how long the user has been in the queue, and other statistics 403 regarding the queue, such as a number 404 of other players currently queued, etc., is also displayed. The user will simply be waiting to be added to a match once they are queued, but they may exit the queue by clicking a "Leave Queue" button 405. Once the matchmaking system 100 has identified a match for the user, a match loading screen is displayed as the match loads in the background and at this point the user can no longer select to leave the queue.

Figure 5:
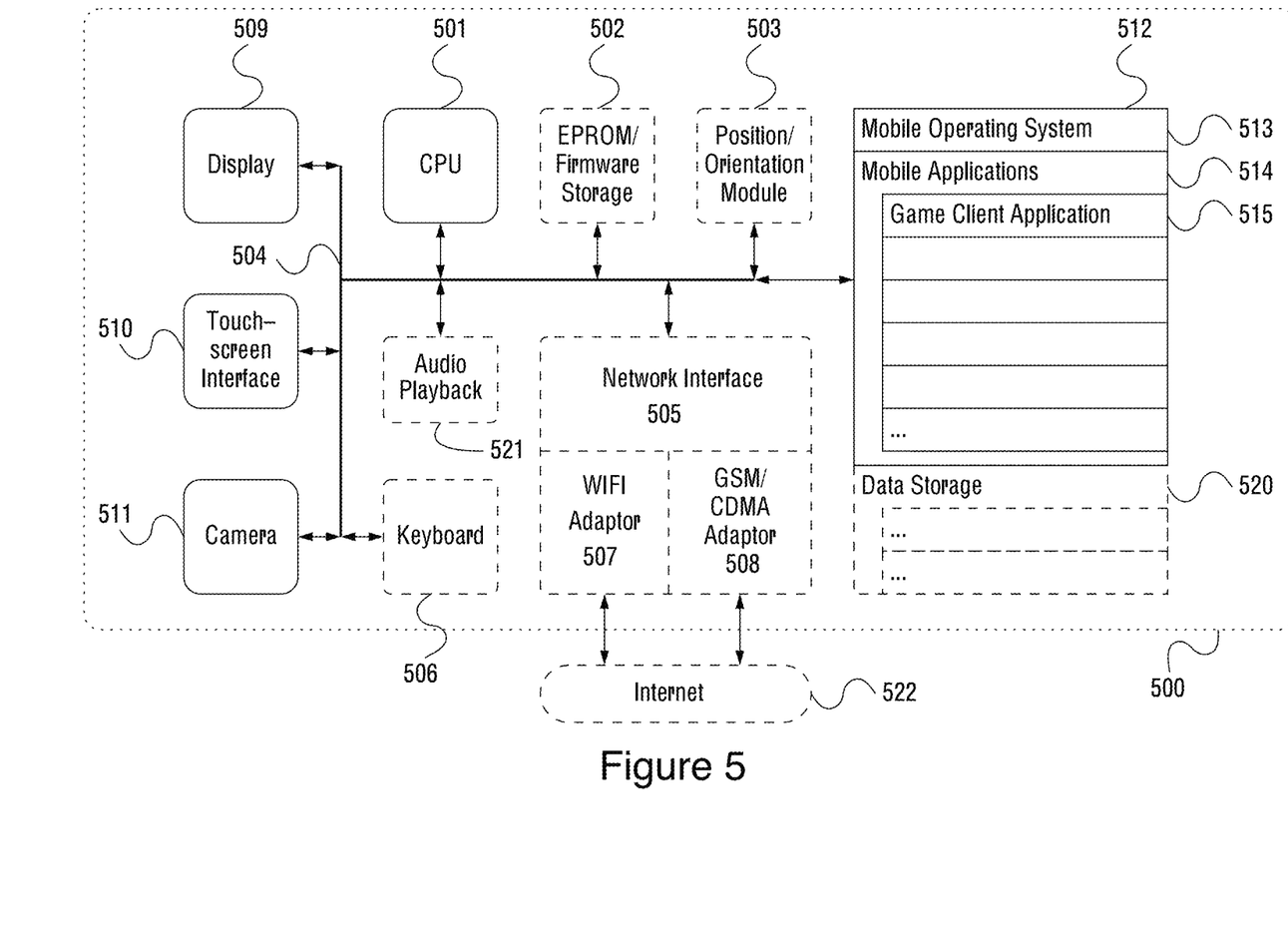
FIG. 5 is a block diagram that illustrates an exemplary embodiment of a client computer on which the aforesaid game client could be deployed.

FIG. 5 is a block diagram that illustrates an exemplary embodiment of a client computer 500 on which the aforesaid game client 201 could be deployed. In one or more embodiments, the client computer 500 may be implemented within the form factor of a mobile computing device, such as a smartphone, a personal digital assistant (PDA), or a tablet computer, all of which are available commercially and are well known to persons of skill in the art. In an alternative embodiment, the client computer 500 may be implemented based on a desktop, a laptop or a notebook computer. Yet in an alternative embodiment, the client computer 500 may be an embedded system, incorporated into an electronic device with certain specialized functions, such as an electronic book (or e-book) reader. Yet in an alternative embodiment, the client computer 500 may be implemented as a part of an augmented reality head-mounted display (HMD) systems, also well known to persons of ordinary skill in the art.

The client computer 500 may include a data bus 504 or other interconnect or communication mechanism for communicating information across and among various hardware components of the client computer 500, and a central processing unit (CPU or simply processor) 501 coupled with the data bus 504 for processing information and performing other computational and control tasks. Client computer 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, client computer 500 may further include a read only memory (ROM or EPROM) 502 or other static storage device coupled to the data bus 504 for storing static information and instructions for the processor 501, such as firmware necessary for the operation of the client computer 500, basic input-output system (BIOS), as well as various configuration parameters of the client computer 501.

In one or more embodiments, the client computer 500 may incorporate a display device 509, which may be also coupled to the data bus 504, for displaying various information to a user of the client computer 500. In an alternative embodiment, the display 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the client computer 500. In an alternative embodiment, the display device 509 may be positioned outside of such enclosure.

In one or more embodiments, the display device 509 may be implemented in a form of a projector or a mini-projector configured to project information on various objects, such as glasses worn by the user. In one or more embodiments, the display device 509 may be configured to be mountable on the head of the user. To this end, the display device 509 may be provided with suitable mounting hardware (not shown).

In one or more embodiments, the client computer 500 may further incorporate an audio playback device 521 connected to the data bus 504 and configured to play various audio files, such as MPEG-3 files, or audio tracks of various video files, such as MPEG-4 files, well known to persons of ordinary skill in the art. To this end, the client computer 500 may also incorporate waive or sound processor or a similar device (not shown).

In one or more embodiments, the client computer 500 may incorporate one or more input devices, such as a touchscreen interface 510 for receiving user's tactile commands, a camera 511 for acquiring still images and video of various objects, as well as a keyboard 506, which all may be coupled to the data bus 504 for communicating information, including, without limitation, images and video, as well as user command selections to the processor 501. In an alternative embodiment, input devices may include a system for tracking eye movements of the user (not shown), which may be used to indicate to the client computer 500 the command selection made by the user.

In one or more embodiments, the client computer 500 may additionally include a positioning and orientation module 503 configured to supply data on the current geographical position, spatial orientation as well as acceleration of the client computer 500 to the processor 501 via the data bus 504. The geographical position information may be obtained by the positioning module 503 using, for example, global positioning system (GPS) technology and/or other positioning techniques such as by using information provided by proximate cell towers and/or WIFI hotspots. The acceleration data is supplied by one or more accelerometers incorporated into the positioning and orientation module 503. Finally, the orientation information may be obtained using acceleration measurements in all 3 axes, including the gravity. In one or more embodiments, the position, orientation and acceleration metadata provided by the positioning and orientation module 503 is continuously recorded and stored in the data storage unit 520.

In one or more embodiments, the client computer 500 may additionally include a communication interface, such as a network interface 505 coupled to the data bus 504. The network interface 505 may be configured to establish a connection between the client computer 500 and the Internet 522 using at least one of WIFI interface 507 and the cellular network (GSM or CDMA) adaptor 508. The network interface 505 may be configured to provide a two-way data communication between the client computer 500 and the Internet 522. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information.

In one or more embodiments, the Internet 522 typically provides data communication through one or more sub-networks to other network resources. Thus, the client computer 500 is capable of accessing a variety of network resources located anywhere on the Internet 522, such as remote media servers, web servers, other content servers as well as other network data storage resources. In one or more embodiments, the client computer 500 is configured send and receive messages, media and other data, including application program code, through a variety of network(s) including Internet 522 by means of the network interface 505. In the Internet example, when the client computer 500 acts as a network client, it may request code or data for an application program executing on the client computer 500. Similarly, it may send various data or computer code to other network resources.

In one or more embodiments, the functionality described herein is implemented by client computer 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 522. Specifically, the computer instructions may be downloaded into the memory 512 of the client computer 500 from the foresaid remote computer via the Internet 522 using a variety of network data communication protocols well known in the art.

In one or more embodiments, the memory 512 of the client computer 500 may store any of the following software programs, applications or modules:

1. Operating system (OS) 513, which may be a mobile operating system for implementing basic system services and managing various hardware components of the client computer 500. Exemplary embodiments of the operating system 513 include, without limitation, Mac OS, Windows, Android, iOS, Windows and Windows Mobile and Linux, which are all well known to persons of skill in the art, as well as any other now known or later developed operating system.

2. Applications 514, which may be mobile applications or desktop applications, may include, for example, a set of software applications executed by the processor 501 of the client computer 500, which cause the client computer 500 to perform certain predetermined functions, such as acquire digital images using the camera 511 or play media files using the display 509 and/or an audio playback device 521. In one or more embodiments, the applications 514 may include a gaming client application 515.

3. Data storage 520 may be used, for example, for storing various data necessary for the operation of the client computer 500.

Figure 6:
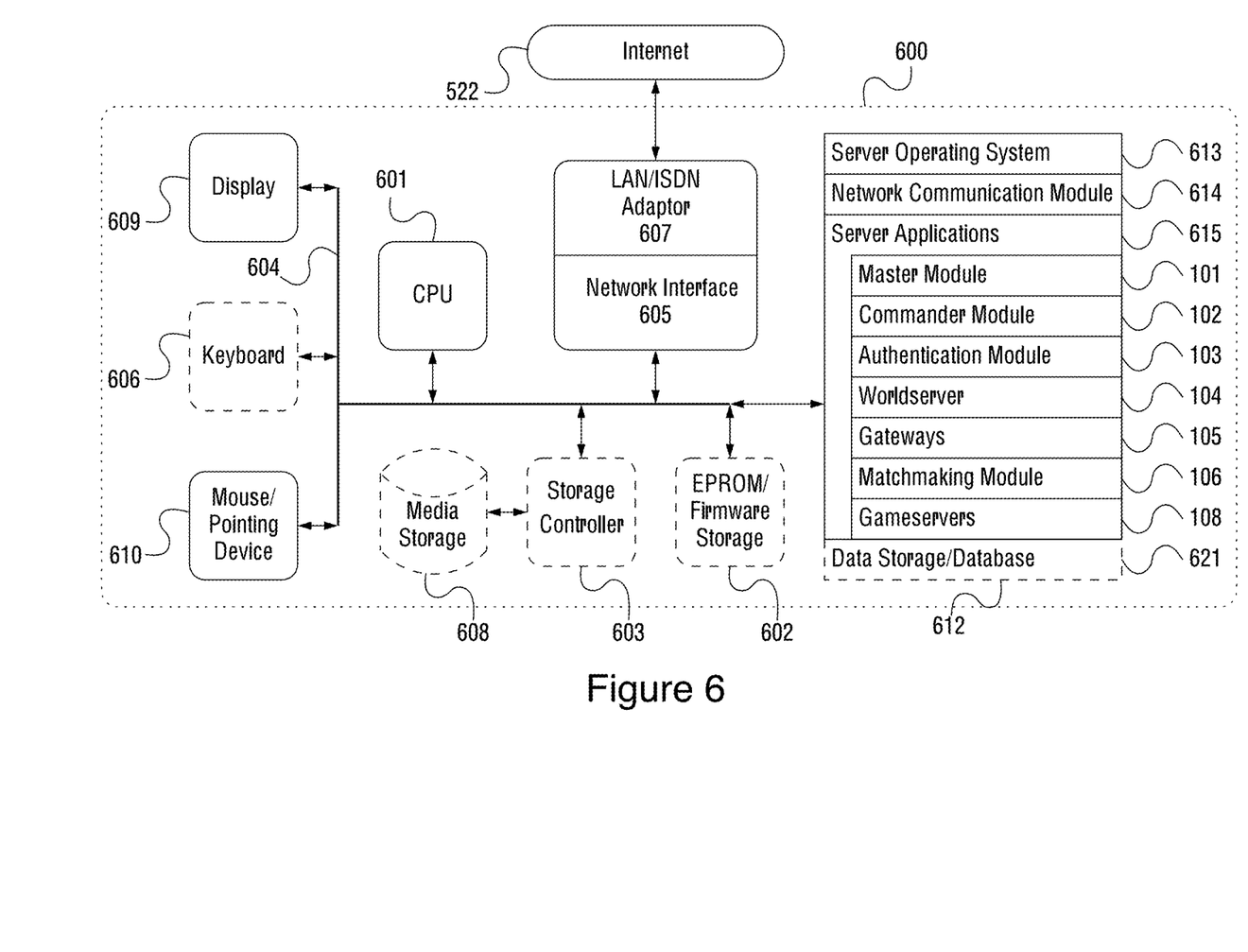
FIG. 6 is a block diagram that illustrates an exemplary embodiment of a computerized server system upon which the various components of the described matchmaking system could be deployed.

FIG. 6 is a block diagram that illustrates an exemplary embodiment of the computerized server system 600 upon which the various components of the matchmaking system 100 described above could be deployed. Specifically, the various modules of the matchmaking system 100 shown in FIG. 1, including the master module 101, the commander modules 102, the authentication module 103, the world-server 104, the gateways 105, the matchmaker 106, the database 107 and the gameservers 108 could be all deployed on the computerized server system 600.

In one or more embodiments, the computerized server system 600 may incorporate a data bus 604, which may be substantially similar and may perform substantially similar functions as the data bus 504 of the client computer 500 illustrated in FIG. 5. In various embodiments, the data bus 604 may use the same or different interconnect and/or communication protocol as the data bus 504. The one or more processors (CPUs) 601, the network interface 605, the EPROM/Firmware storage 602, the display 609 and the keyboard 606 of the computerized server system 600 may be likewise substantially similar to the respective processor 501, the network interface 505, the EPROM/Firmware storage 502, the display 509 and the keyboard 506 of the client computer 500, except that the former components are deployed in a server platform configuration. In various implementations, the one or more processor 601 may have substantially increased processing power as compared with the processor 501.

In addition to the input device 606 (keyboard), the computerized server system 600 may additionally include a cursor control device 610, such as a mouse, a trackball, or cursor direction keys for communicating direction information and command selections to processor 601 and for controlling cursor movement on the display 609. This input device typically has two degrees of freedom in two axes, a first axis (e.g., x) and a second axis (e.g., y), that allows the device to specify positions in a plane.

The LAN/ISDN adaptor 607 of the computerized server system 600 may be implemented, for example, using an integrated services digital network (ISDN) card or a modem to provide a data communication connection to a corresponding type of telephone line, which is interfaced with the Internet 522 using Internet service provider's hardware (not shown). As another example, the LAN/ISDN adaptor 607 may be a local area network interface card (LAN NIC) to provide a data communication connection to a compatible LAN and the Internet 522. To store various media files, the computerized server system 600 may be provided with a media storage 608 connected to the data bus 604 by means of a storage controller 603.

In one or more embodiments, the memory 612 of the computerized server system 600 may store any of the following software programs, applications or modules:

1. Server operating system (OS) 613, which may be an operating system for implementing basic system services and managing various hardware components of the computerized server system 600. Exemplary embodiments of the server operating system 613 include, without limitation, Linux, Unix, Windows Server, FreeBSD, NetBSD, Mac OSX Server, HP-UX, AIX and Solaris, which are all well known to persons of skill in the art, as well as any other now known or later developed operating system.

2. Network communication module 614 may incorporate, for example, one or more network protocol stacks which are used to establish a networking connection between the computerized server system 600 and the various network entities of the Internet 522, such as the client computer 500, using the network interface 605 working in conjunction with the LAN/ISDN adaptor 607.

3. Server applications 615 may include, for example, a set of software applications executed by one or more processors 601 of the computerized server system 600, which cause the computerized server system 600 to perform certain predetermined functions or tasks. In one or more embodiments, the server applications 615 may include the master module 101, the commander modules 102, the authentication module 103, the worldserver 104, the gateways 105, the matchmaker 106, the database 107 and the gameservers 108.

4. Data storage 621 may be used, for example, for storing the matchmaking queue, the point values for the players and vehicles, as well as vehicle tier information, as well as any other data used in the aforesaid matchmaking process described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in a computerized matchmaking system and method for massive multiplayer online games. It is intended that the specification and examples be considered as exemplary only, with a true scope and spirit of the invention being indicated by the following claims.

What is claimed is:

1. A computerized system for matchmaking a plurality of players in a multiplayer online game into two player teams, the system comprising a processing unit and a memory, the memory containing a set of instructions, which, when executed by the processing unit cause the processing unit to perform a method comprising:
   a. identifying, using the processing unit, a player from the plurality of players as a match seed player;
   b. establishing, using the processing unit, a point range based on a total number of points associated with the identified match seed player, wherein the point range represents a minimum and a maximum number of points that a player from the plurality of players would be required to have in order to be considered for the player team;
   c. providing, using the processing unit, a plurality of buckets, each bucket representing a predetermined need within a team of players;
   d. temporarily assigning, using the processing unit, players from the plurality of players to the plurality of buckets;
   e. assigning, using the processing unit, the players from the plurality of players to a plurality of class pools based on a vehicle class associated with each player of the plurality of players; and
   f. distributing, using the processing unit, players assigned to each class pool between two teams one at a time based on point values associated with the respective players.

2. The computerized system of claim 1, wherein the method further comprises establishing a matchmaking queue and temporarily assigning each of the plurality of players into the matchmaking queue based on a time when the player joined a game session.

3. The computerized system of claim 2, wherein the match seed player is a player from the plurality of players who has spent the longest time in the matchmaking queue.

4. The computerized system of claim 1, wherein each of the plurality of buckets is associated with a second point range and wherein the players from the plurality of players are assigned to the plurality of buckets based on a total number of points associated with each player and the second point range of each bucket.

5. The computerized system of claim 4, wherein the second point range of each bucket in the plurality of buckets expands based on a predetermined time interval to allow more players to be assigned to the bucket.

6. The computerized system of claim 1, wherein the point range is determined by adding to and subtracting a predetermined percentage of the total number of points associated with the identified match seed player from the total number of points associated with the identified match seed player.

7. The computerized system of claim 1, wherein the point range is additionally determined using a randomization factor and wherein the randomization factor varies based on a match such that the point range of a first match is different from the point range of a second match.

8. A computer-implemented method for matchmaking a plurality of players in a multiplayer online game into two player teams, the computer-implemented method being performed in a system comprising a processing unit and a memory, the method comprising:

a. identifying, using the processing unit, a player from the plurality of players as a match seed player;
b. establishing, using the processing unit, a point range based on a total number of points associated with the identified match seed player, wherein the point range represents a minimum and a maximum number of points that a player from the plurality of players would be required to have in order to be considered for the player team;
c. providing, using the processing unit, a plurality of buckets, each bucket representing a predetermined need within a team of players;
d. temporarily assigning, using the processing unit, players from the plurality of players to the plurality of buckets;
e. assigning, using the processing unit, the players from the plurality of players to a plurality of class pools based on a vehicle class associated with each player of the plurality of players; and
f. distributing, using the processing unit, players assigned to each class pool between two teams one at a time based on point values associated with the respective players.

9. The computer-implemented method of claim 8, further comprising establishing a matchmaking queue and temporarily assigning each of the plurality of players into the matchmaking queue based on a time when the player joined a game session.

10. The computer-implemented method of claim 9, wherein the match seed player is a player from the plurality of players who has spent the longest time in the matchmaking queue.

11. The computer-implemented method of claim 8, wherein each of the plurality of buckets is associated with a second point range and wherein the players from the plurality of players are assigned to the plurality of buckets based on a total number of points associated with each player and the second point range of each bucket.

12. The computer-implemented method of claim 11, wherein the second point range of each bucket in the plurality of buckets expands based on a predetermined time interval to allow more players to be assigned to the bucket.

13. The computer-implemented method of claim 8, wherein the point range is determined by adding to and subtracting a predetermined percentage of the total number of points associated with the identified match seed player from the total number of points associated with the identified match seed player.

14. The computer-implemented method of claim 8, wherein the point range is additionally determined using a randomization factor and wherein the randomization factor varies based on a match such that the point range of a first match is different from the point range of a second match.

15. A non-transitory computer-readable medium containing a set of instructions for matchmaking a plurality of players in a multiplayer online game into two player teams, the set of instructions, when executed in connection with a system comprising a processing unit and a memory, causes the processing unit to perform a method comprising:
a. identifying, using the processing unit, a player from the plurality of players as a match seed player;
b. establishing, using the processing unit, a point range based on a total number of points associated with the identified match seed player, wherein the point range represents a minimum and a maximum number of points that a player from the plurality of players would be required to have in order to be considered for the player team;
c. providing, using the processing unit, a plurality of buckets, each bucket representing a predetermined need within a team of players;
d. temporarily assigning, using the processing unit, players from the plurality of players to the plurality of buckets;
e. assigning, using the processing unit, the players from the plurality of players to a plurality of class pools based on a vehicle class associated with each player of the plurality of players; and
f. distributing players assigned to each class pool between two teams one at a time based on point values associated with the respective players.

16. The non-transitory computer-readable medium of claim 15, wherein the method further comprises establishing a matchmaking queue and temporarily assigning each of the plurality of players into the matchmaking queue based on a time when the player joined a game session.

17. The non-transitory computer-readable medium of claim 16, wherein the match seed player is a player from the plurality of players who has spent the longest time in the matchmaking queue.

18. The non-transitory computer-readable medium of claim 15, wherein each of the plurality of buckets is associated with a second point range and wherein the players from the plurality of players are assigned to the plurality of buckets based on a total number of points associated with each player and the second point range of each bucket.

19. The non-transitory computer-readable medium of claim 18, wherein the second point range of each bucket in the plurality of buckets expands based on a predetermined time interval to allow more players to be assigned to the bucket.

20. The non-transitory computer-readable medium of claim 15, wherein the point range is determined by adding to and subtracting a predetermined percentage of the total number of points associated with the identified match seed player from the total number of points associated with the identified match seed player.

* * * * *